(12) United States Patent
Salter et al.

(10) Patent No.: US 10,137,825 B1
(45) Date of Patent: Nov. 27, 2018

(54) VEHICLE LAMP ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Ulrich Stuhec, Ann Arbor, MI (US); Keith Hoelscher, Northville, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/722,059

(22) Filed: Oct. 2, 2017

(51) Int. Cl.
*B60Q 1/26* (2006.01)
*B60Q 1/00* (2006.01)
*B60Q 1/24* (2006.01)
*F21S 43/235* (2018.01)
*F21S 43/14* (2018.01)
*B60R 1/12* (2006.01)

(52) U.S. Cl.
CPC ......... *B60Q 1/2665* (2013.01); *B60Q 1/0023* (2013.01); *B60Q 1/24* (2013.01); *B60R 1/1207* (2013.01); *F21S 43/14* (2018.01); *F21S 43/235* (2018.01); *B60R 2001/1223* (2013.01)

(58) Field of Classification Search
CPC ............ B60K 37/06; B60K 2350/1012; B60K 2350/1024; B60K 2350/1028; B60K 35/00; B60K 28/12; B60R 1/1207; B60R 1/00; B60R 1/04; B60R 2001/1215; B60R 2011/0026; B60R 2011/0033; F21V 9/16; F21V 9/30

USPC ......................................................... 362/494
See application file for complete search history.

(56) References Cited

U.S. PATENT DOCUMENTS

| | | | |
|---|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,176,602 B1 | 1/2001 | Pastrick et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,710,710 B1 | 3/2004 | Wang |
| 6,729,738 B2 | 5/2004 | Fuwausa et al. |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Thien M Le
(74) *Attorney, Agent, or Firm* — Jason Rogers; Price Heneveld LLP

(57) ABSTRACT

A vehicle mirror assembly is provided herein. The mirror assembly includes a first light source disposed within a housing and is operably coupled with a first light output window disposed on an outboard portion of the housing. A door ajar sensor is disposed within a vehicle. Emitted light is emanated from the first light output window through a window of the vehicle when the door ajar sensor detects a vehicle door is in an open position.

20 Claims, 10 Drawing Sheets

(56) References Cited

U.S. PATENT DOCUMENTS

| | | |
|---|---|---|
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,963,701 B2 | 2/2015 | Rodriguez Barros et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,403,475 B2 | 8/2016 | Cheng |
| 9,452,709 B2 | 9/2016 | Aburto Crespo |
| 9,568,659 B2 | 2/2017 | Verger et al. |
| 9,616,812 B2 | 4/2017 | Sawayanagi |
| 9,694,749 B2* | 7/2017 | Lynam ............... B60R 1/003 |
| 9,924,579 B2* | 3/2018 | Tran .................. F24F 11/30 |
| 2002/0159270 A1* | 10/2002 | Lynam ............... B60K 35/00 |
| | | 362/492 |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0051517 A1* | 2/2009 | Suzuki ............... B60Q 1/323 |
| | | 340/438 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0218212 A1 | 8/2014 | Nykerk |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0175057 A1* | 6/2015 | Salter ................. F21S 43/13 |
| | | 362/510 |
| 2015/0267881 A1 | 9/2015 | Salter et al. |
| 2015/0307033 A1 | 10/2015 | Preisler et al. |
| 2015/0323149 A1* | 11/2015 | Salter ................. F21S 43/13 |
| | | 362/510 |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0159286 A1* | 6/2016 | Harville ............. B60Q 1/2665 |
| | | 340/438 |
| 2016/0236613 A1 | 8/2016 | Trier |
| 2016/0240794 A1 | 8/2016 | Yamada et al. |
| 2016/0258591 A1* | 9/2016 | Salter ................. B60Q 1/323 |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |

(56) References Cited

FOREIGN PATENT DOCUMENTS

| DE | 4120677 A1 | 1/1992 |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| GB | 2500312 A | 9/2013 |
| JP | 2000159011 A | 6/2000 |
| JP | 2003182365 A | 7/2003 |
| JP | 2007238063 A | 9/2007 |
| KR | 20060026531 A | 3/2006 |
| KR | 20090011500 A | 2/2009 |
| WO | 2006047306 A1 | 5/2006 |
| WO | 2014068440 A1 | 5/2014 |
| WO | 2014161927 A1 | 10/2014 |

* cited by examiner

VEHICLE LAMP ASSEMBLY

FIELD OF THE INVENTION

The present disclosure generally relates to vehicle lamps, and more particularly, to vehicle lamps disposed on an exterior portion of the vehicle.

BACKGROUND OF THE INVENTION

Lamp assemblies are commonly employed in vehicles to provide various lighting functions. For some vehicles, it may be desirable to have a more efficient lamp assembly that may be manufactured at reduced costs when compared to current mirror lamp assemblies.

SUMMARY OF THE INVENTION

According to one aspect of the present disclosure, a side mirror assembly is provided herein. The side mirror assembly includes a first light source disposed within a housing and operably coupled with a first light output window disposed on an outboard portion of the housing. A door ajar sensor is configured to detect a position of a door and emitted light is emanated from the first light output window through a window when in response to the door being placed in an open position.

According to another aspect of the present disclosure, a lamp assembly is provided herein. The lamp includes a light source disposed within a housing and operably coupled with a light output window disposed on the housing. A door ajar sensor is operably coupled with the light source. Emitted light is emanated from the light output window through a front window when the door ajar sensor detects a front door is open and through a rear window when the door ajar sensor detects a rear door is open.

According to yet another aspect of the present disclosure, a vehicle is provided herein. The vehicle includes a first light output window and a second light output window disposed on a housing. Emitted light is emanated from the first light output window through a first window when a door ajar sensor detects a first door is open and from the second light output window through a second window when the door ajar sensor detects a second door is open.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
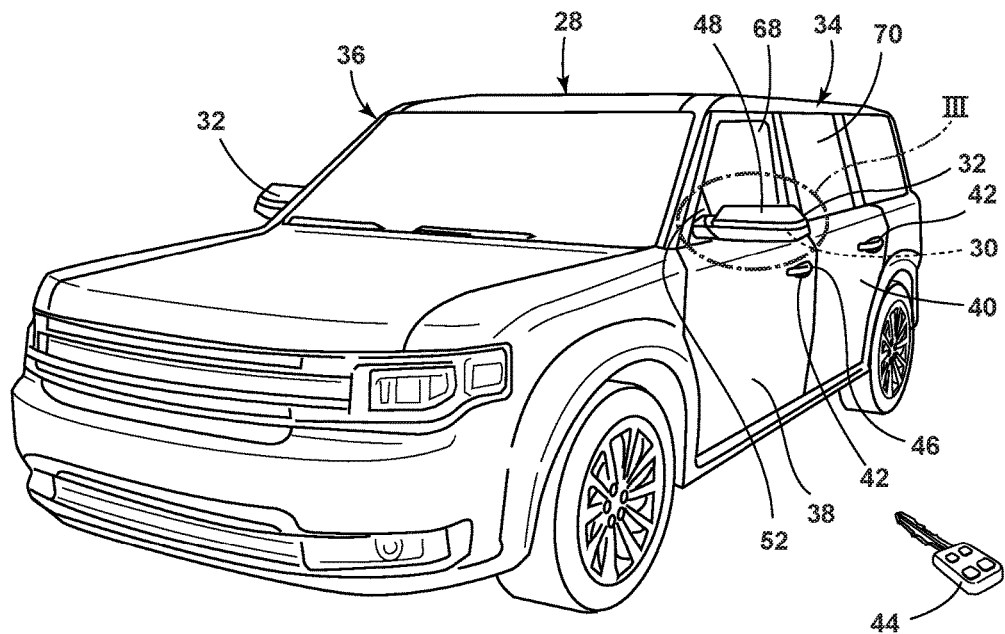
FIG. 2 is a front perspective view of an automotive vehicle employing a lamp assembly in an exterior mirror assembly of the vehicle, according to some examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lamp assembly for a vehicle. The lamp assembly may notify proximate vehicles and/or persons of a vehicle door condition. The lamp assembly may be disposed on a side mirror of the vehicle and illuminated by one or more light sources therein. The lamp assembly may further employ one or more phosphorescent and/or luminescent structures to luminesce in response to predefined events. The one or more luminescent structures may be configured to convert emitted light received from an associated light source and re-emit the light at a different wavelength generally found in the visible spectrum.

Figure 1A:
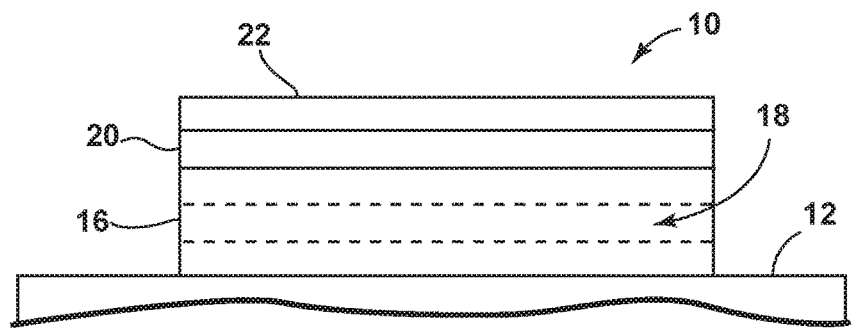
FIG. 1A is a side view of a luminescent structure rendered as a coating, according to some examples.
Figure 1B:
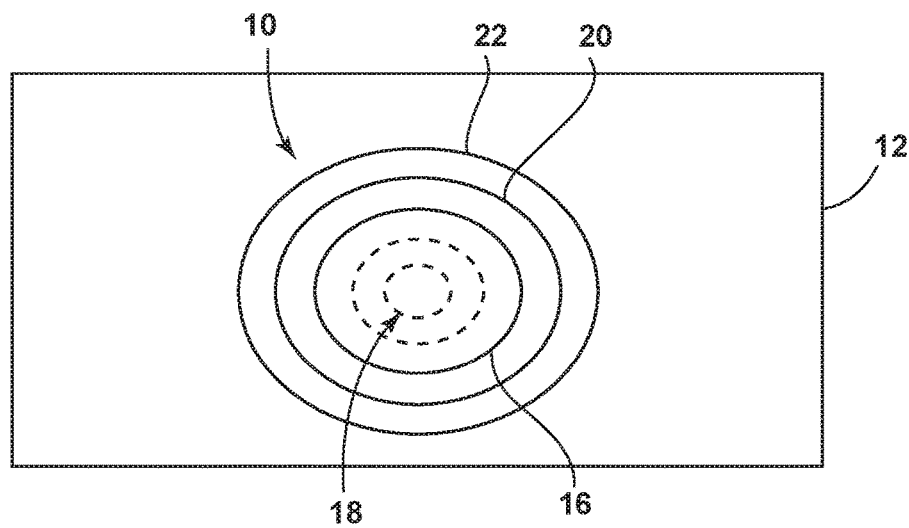
FIG. 1B is a top view of a luminescent structure rendered as a discrete particle, according to some examples.
Figure 1C:
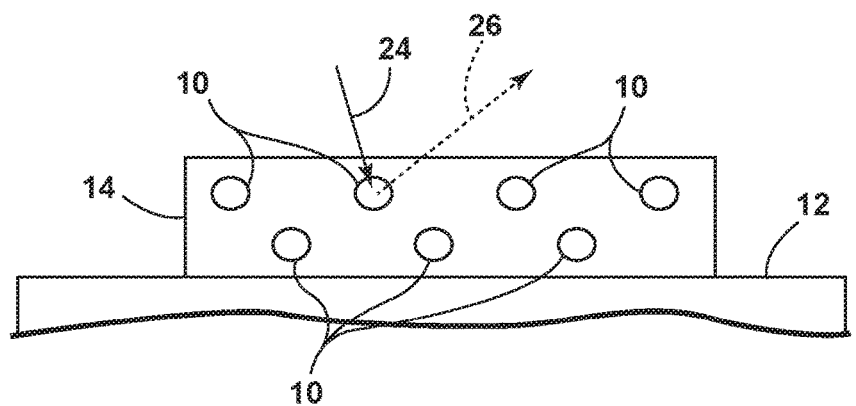
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an emitted light 24 of a specific wavelength, thereby causing the light to undergo a conversion process. Under the principle of down conversion, the emitted light 24 is converted into a longer-wavelength, converted light 26 that is outputted from the luminescent structure 10. Conversely, under the principle of up conversion, the emitted light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the emitted light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^4$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the emitted light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

Figure 4:
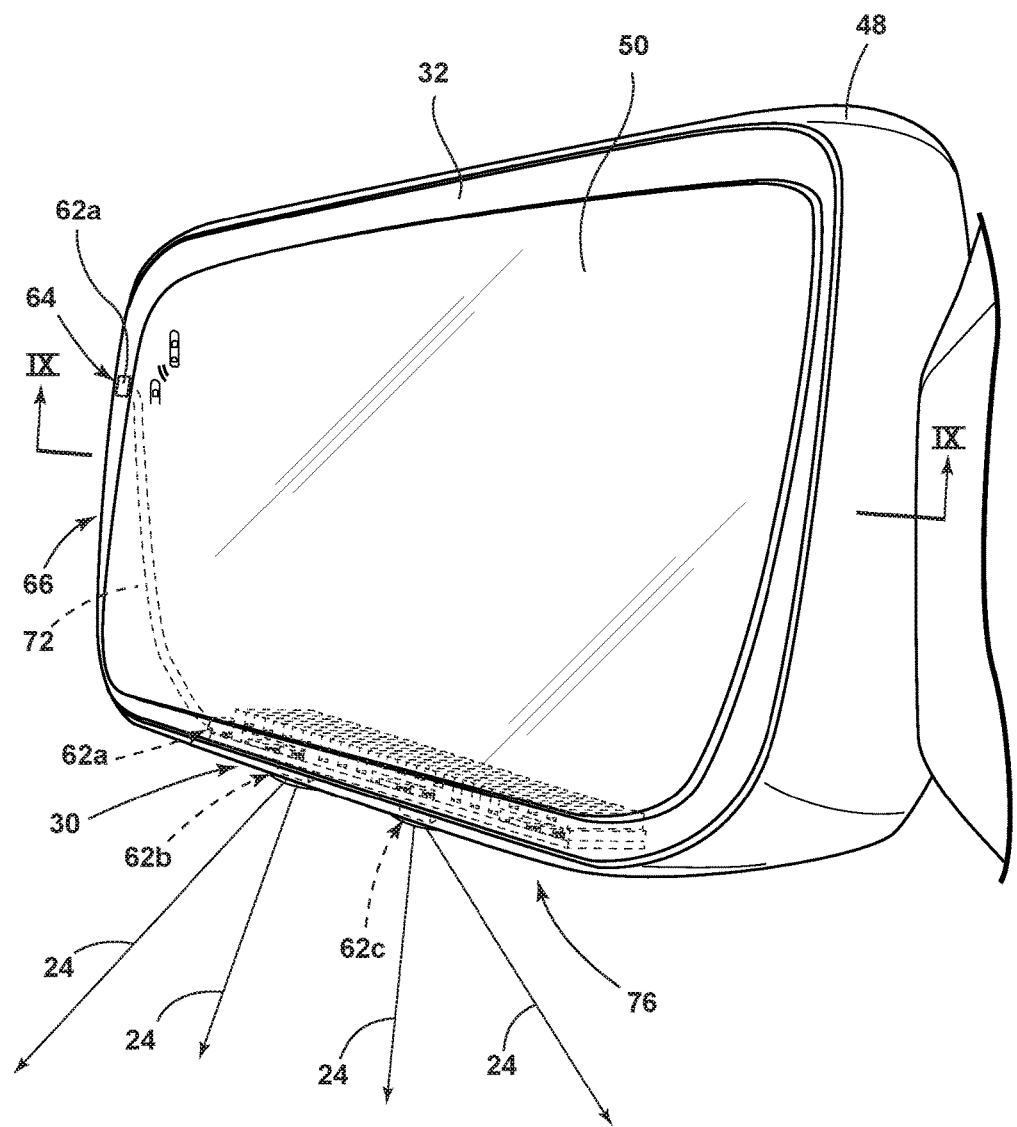
FIG. 4 is a rear perspective view of the mirror assembly, according to some examples.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue emitted light 24 emanated from one or more light sources 62a, 62b, 62c (FIG. 4). According to various examples, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the emitted light 24. The emitted light 24 may be emitted from any excitation source (e.g., any natural light source, such as the sun, and/or any artificial light sources 62a, 62b, 62c). The long-persistence luminescent material 18 may be defined as having a long decay time due to its ability to store the emitted light 24 and release the converted light 26 gradually, for a period of several minutes or hours, once the emitted light 24 is no longer present.

The long-persistence luminescent material 18, according to various examples, may be operable to emit light at or above an intensity of 0.32 mcd/$m^2$ after a period of 10 minutes. Additionally, the long-persistence luminescent material 18 may be operable to emit light above or at an intensity of 0.32 mcd/$m^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any one or more light sources 62a, 62b, 62c that emit the emitted light 24, including, but not limited to, natural light sources (e.g., the sun) and/or any artificial one or more light sources 62a, 62b, 62c. The periodic absorption of the emitted light 24 from any excitation source may provide for a substantially sustained charge of the long-persistence luminescent material 18 to provide for consistent passive illumination. In various examples, a light sensor may monitor the illumination intensity of the luminescent structure 10 and actuate an excitation source when the illumination intensity falls below 0.32 mcd/$m^2$, or any other predefined intensity level.

The long-persistence luminescent material 18 may correspond to alkaline earth aluminates and silicates, for example, doped di-silicates, or any other compound that is capable of emitting light for a period of time once the emitted light 24 is no longer present. The long-persistence luminescent material 18 may be doped with one or more ions, which may correspond to rare earth elements, for example, $Eu2+$, $Tb3+$, and/or $Dy3$. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the emitted light 24 of a particular wavelength, the luminescent structure 10 may emit any color light (e.g., blue or red) therefrom at any desired brightness. According to various examples, a blue-emitting phosphorescent material may have the structure $Li_2ZnGeO_4$ and may be prepared by a high-temperature solid-state reaction method or through any other practicable method and/or process. The afterglow may last for a duration of 2-8 hours and may originate from the emitted light 24 and d-d transitions of $Mn2+$ ions.

According to an alternate non-limiting example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Figure 3:
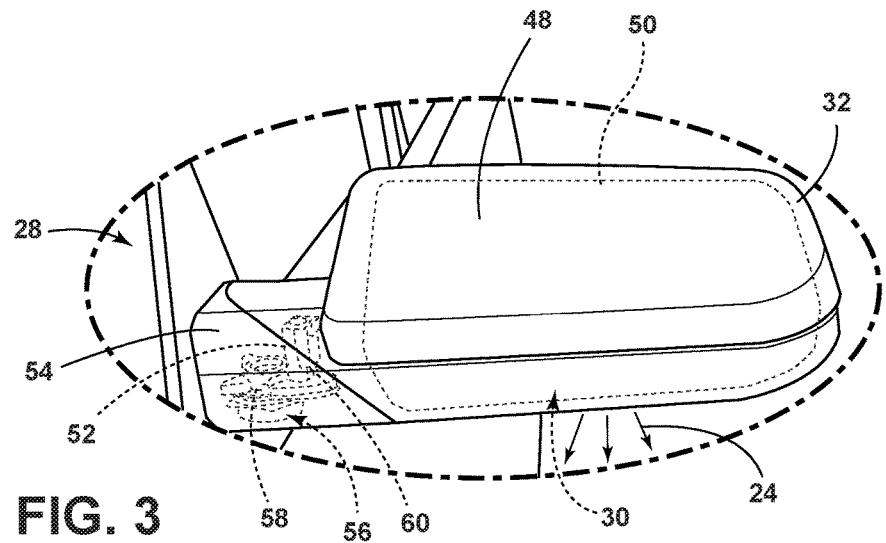
FIG. 3 is an enlarged view of section III of FIG. 2 illustrating the exterior mirror assembly with a plurality of light sources disposed within the lamp assembly.

Referring to FIGS. 2 and 3, an automotive vehicle 28 is generally illustrated employing a lamp assembly 30, according to some examples. The vehicle 28 shown is some examples of a vehicle 28 having a pair of exterior rearview mirror assemblies 32 mounted on opposing lateral side portions 34, 36 of the vehicle 28 generally near the front side of front doors 38, as is generally known in the art. In some examples, the vehicle 28 may also include one or more rear doors 40.

The front and/or rear doors 38, 40 of the vehicle 28 may each include front side and rear side windows 68, 70, respectively, therein. In some aspects of the lamp assembly 30, the windows 68, 70 may be fabricated from a glass or glass-ceramic composition that is processed according to methods (e.g., tempered) that may be suitable for use as a window 68, 70 in a vehicular application. In some examples, the windows 68, 70 of the vehicle 28 may have a composition, and are processed, to achieve high optical transmissivity and transparency with little to no coloration. In some other examples of the assembly 30, the windows 68, 70 can also be produced with some tinting, particularly in applications of the assembly 30 in which it is frequently exposed to sunlight.

The front doors 38 and the rear doors 40 may each include a handle 42 with a latch mechanism to enable an occupant to engage and unlatch the latch mechanism to open the door 38, 40 for access to a passenger compartment of the vehicle 28. A remote key fob 44 is shown, which may be operated by an occupant to activate various features including door lock and unlock functions. The handle 42 is shown including a proximity sensor 46, such as a capacitive sensor, for sensing the hand of the occupant in close proximity to the handle 42.

The exterior mirror assembly 32 may include a housing 48 and a reflective element 50. The housing 48 may include an opening for enclosing the reflective element 50. The reflective element 50 may be used for viewing an area laterally adjacent and/or rearwardly of the vehicle 28. The housing 48 may include a tilt actuator (not shown) therein for providing an occupant of the vehicle 28 with an adjustable view.

The housing 48 may be operably coupled with a pivot assembly 52 that is used to connect the housing 48 to a mirror bracket 54. The mirror bracket 54 is secured to the vehicle 28 and the pivot assembly 52 is used to connect the housing 48 securely to the vehicle 28. While the mirror assembly 32 is illustrated on a driver's side portion 34 of the vehicle 28, it will be understood that the mirror described herein may be disposed on either lateral side portion 34, 36, or any other portion, of the vehicle 28 without departing from the scope of the present disclosure.

The housing 48 may be operable between a deployed position and a folded position. In some examples, the pivot assembly 52 is electronically controlled and includes a pivot drive assembly 56 adapted for supporting a drive motor 58 and a transmission assembly 60. The drive motor 58 may be electrically powered by the vehicle electrical system, and controlled by a suitable switching device, which may incorporate digital microprocessor-based logic devices. The transmission assembly 60 is adapted to convert the rotation of the drive motor shaft (not shown) to controlled rotation of the housing 48 about an axis of rotation. The drive motor 58 may alter the position of the mirror assembly 32 automatically based on a predefined vehicle event, such as an engine of the vehicle 28 being disposed in the ON/OFF state and/or a welcome or farewell sequence, meaning that rotation of the mirror assembly 32 may occur as an occupant of the vehicle 28 leaves and/or approaches the vehicle 28 employing the mirror assembly 32. Additionally, and/or alternatively, the mirror assembly 32 may be rotated based on any other predefined event without departing from the scope of the present disclosure. Additionally still, the mirror assembly 32 may be rotated based on actuation of a switch by an occupant of the vehicle 28. The switch may be disposed within the vehicle 28 and/or on the key fob 44 of the vehicle 28. Additionally still, the mirror assembly 32 may be operably coupled with any other system and/or sensor within the vehicle 28 such that the mirror assembly 32 may be rotated based on actuation of that system or sensor.

Referring to FIG. 4, the lamp assembly 30 is installed within the housing 48 and is configured to project emitted light 24 outwardly from the housing 48. Accordingly, the lamp assembly 30 may include the one or more light sources 62a, 62b, 62c within the housing 48 of the mirror assembly 32. A first light output window 64 is disposed on an outboard portion 66 of the housing 48 and is operably coupled with one or more light sources 62a, 62b, 62c. The outboard portion 66 of the housing 48 is further from the vehicle 28 than the pivot assembly 52 when the housing 48 is in the deployed position. The emitted light 24 directed through the first light output window 64 may be used for a variety of functions, as will be provided in more detail below. For example, the first light output window 64 may be utilized to notify an operator of the vehicle 28 about a proximate vehicle on the same side of the vehicle 28 as the mirror assembly 32 (e.g., blind spot detection). Additionally, and/or alternatively, the first light output window 64 may be configured to direct emitted light 24 through the front side window 68 and/or the rear side window 70 of the vehicle 28 when the respective front door 38 and/or rear door 40 is disposed in an open position. The emitted light 24 may be additionally and/or alternatively used as a turn signal, a puddle lamp, ambient lighting, feature lighting, and/or for any other function. Moreover, a light guide 72 may be operably coupled to the first light output window 64 and/or the light sources 62a, 62b, 62c that are configured to direct emitted light 24 through the first light output window 64.

The second and third light sources 62b, 62c may be disposed proximate a bottom portion 76 of the housing 48. The second light source 62b may direct emitted light 24 below the housing 48. Accordingly, the second light source 62b may serve as a puddle lamp that illuminates a ground surface 78 (FIG. 5) adjacent to the vehicle 28 to enable the occupant to approach and access the vehicle 28 and view the ground surface 78 proximate thereto. The third light source 62c may likewise be disposed on the bottom portion 76 of the housing 48. The third light source is configured to direct emitted light 24 along at the vehicle 28 (e.g., outer panel 96 (FIG. 5), body panel, etc.).

With respect to the examples described herein, the light sources 62a, 62b, 62c may each be configured to emit visible and/or non-visible light, such as blue light, UV light, infrared, and/or violet light and may include any form of light source. For example fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, or any other form of lighting. Further, various types of LEDs are suitable for use as the light source 62a, 62b, 62c including, but not limited to, top-emitting LEDs, side-emitting LEDs, and others. Moreover, according to various examples, multicolored light sources 62a, 62b, 62c, such as Red, Green, and Blue (RGB) LEDs that employ red, green, and blue LED packaging may be used to generate various desired colors of light output from a single light source 62a, 62b, 62c, according to known light color mixing techniques.

Figure 5:
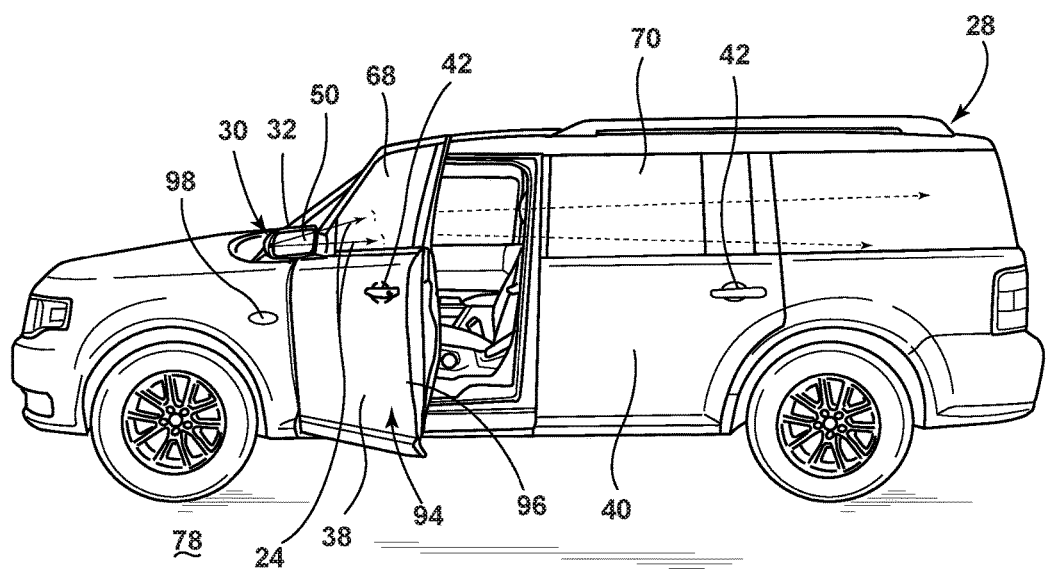
FIG. 5 is a side plan view of the vehicle with a door of the vehicle in an open position.
Figure 6:
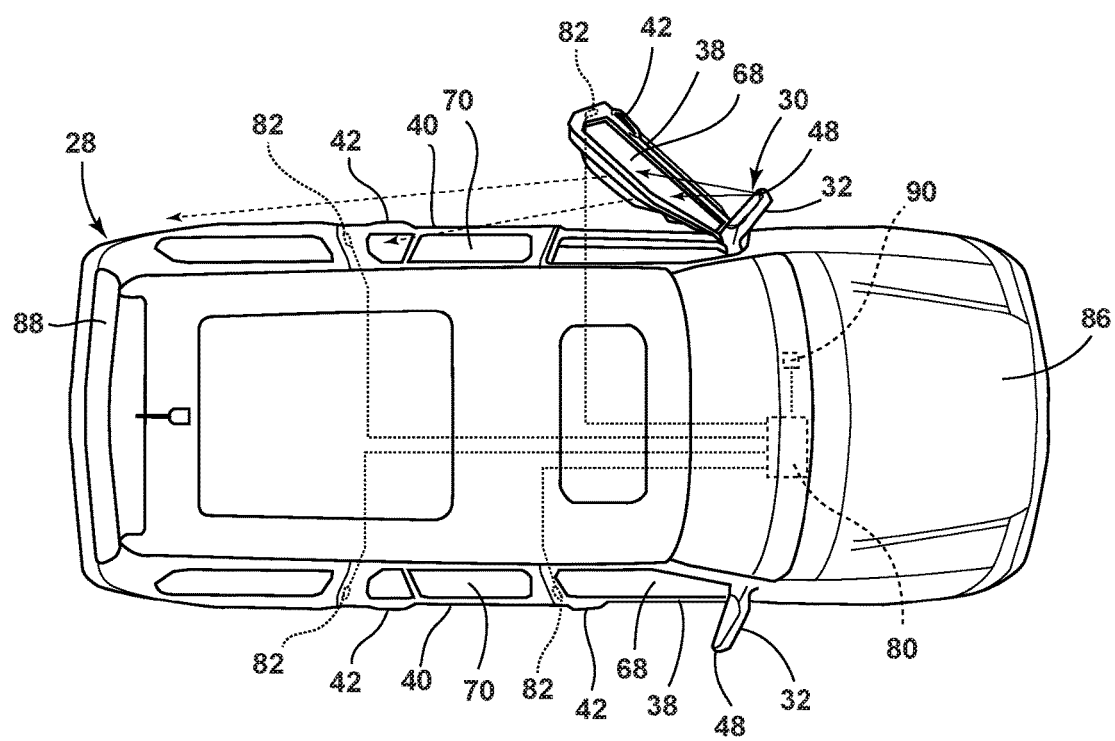
FIG. 6 is a top plan view of the vehicle with the door in the open position.

Referring to FIGS. 5 and 6, in some examples, the lamp assembly 30 is configured to direct emitted light 24 through the front and/or rear side windows 68, 70 of the vehicle 28. In some instances, the front and/or rear side windows 68, 70 may be disposed within the respective vehicle door 38, 40 that is movable between a closed position and an open position. The emitted light 24 may be directed through the front and/or rear side windows 68, 70 when the respective door 38, 40 is placed in the open position to notify approaching persons and/or vehicles of the open position and/or an occupant's intention to further open the door 38, 40 to exit or enter the vehicle 28.

The vehicle 28 includes a vehicle computer 80 that generally includes one or more computing device, e.g., controllers or the like included in the vehicle 28 for monitoring and/or controlling various vehicle components, e.g., an engine control unit (ECU), transmission control unit (TCU), etc. The computer 80 is generally configured for communications on a controller area network (CAN) bus or the like. The computer 80 may also have a connection to an onboard diagnostics connector (OBD-II). Via the CAN bus, OBD-II, and/or other wired or wireless mechanisms, the computer 80 may transmit messages to various devices in the vehicle 28 and/or receive messages from the various devices, e.g., controllers, actuators, sensors, electronic devices, etc., including a door ajar sensor 82 that may be configured to determine whether the door 38, 40 has been placed in the open position.

In some instances, the door ajar sensor 82 may include a switch or proximity sensor, such as a Hall-effect sensor. The door ajar sensor 82 may be configured to output a door position signal 120 (FIG. 12) and may be capable of detecting a magnitude at which the door 38, 40 has been rotated. For example, the front door 38 and/or the rear door 40 may have a magnitude of rotation of 100 degrees and the door ajar sensor 82 may be capable of determining the magnitude of which the front door 38 and/or the rear door 40 has been opened. Based on the magnitude of rotation, the door ajar sensor 82, or a controller 84 (FIG. 12), may be capable of determining a percentage open of the front door 38 and/or the rear door 40. When the front door 38 and/or the rear door 40 is closed, the door position signal 120 may indicate a closed state (i.e., the front door 38 and/or the rear door 40 is closed). When the front door 38 and/or the rear door 40 is open, the door position signal 120 may indicate the open state (i.e., the front door 38 and/or the rear door 40 is open). The vehicle 28 may include any number of door ajar sensors 82. In some instances, at least one door ajar sensor 82 may be disposed on each front door 38 and/or rear door 40. In addition, the door ajar sensors 82 may be located on the hood 86, trunk, lift gate 88, and possibly other locations throughout the vehicle 28 such as lockable storage compartments.

According to various examples, a plurality of illumination patterns is generated based on the door position signal 120 provided from the door ajar sensor 82. For example, the first light source 62a may illuminate when the front door 38 of the vehicle 28 is open. The emitted light 24 from the first light source 62a may be directed through the front side window 68 to provide a notification to proximate persons and/or objects of the open position. The emitted light 24 from the first light source 62a and directed through the front side window 68 may also provide functional lighting to occupants proximate the vehicle 28 and/or provide ambient lighting of the vehicle 28.

With reference to FIG. 6, in some examples, the vehicle 28 includes a light sensor 90 that may be utilized for varying the intensity of emitted light 24 emitted from the lamp assembly 30. The light sensor 90 detects environmental lighting conditions, such as whether the vehicle 28 is in day-like conditions (i.e., higher light level conditions) and/or whether the vehicle 28 is in night-like conditions (i.e., lower light level conditions). The light sensor 90 can be of any suitable type and can detect the day-like and night-like conditions in any suitable fashion. According to some examples, the colors of light and/or intensities of the emitted light 24 from the lamp assembly 30 may be varied based on the detected conditions. Moreover, the first, second, and/or third light sources 62a, 62b, 62c may be activated in low-light conditions and when the front door 38 and/or the rear door 40 is placed in the open position. The light sensor 90 may be integrated into the vehicle 28 or into the lamp assembly 30. Moreover, the intensity of emitted light 24 may additionally, or alternatively, be varied with the initiation of the vehicle's headlights or any other vehicle system.

Figure 8:
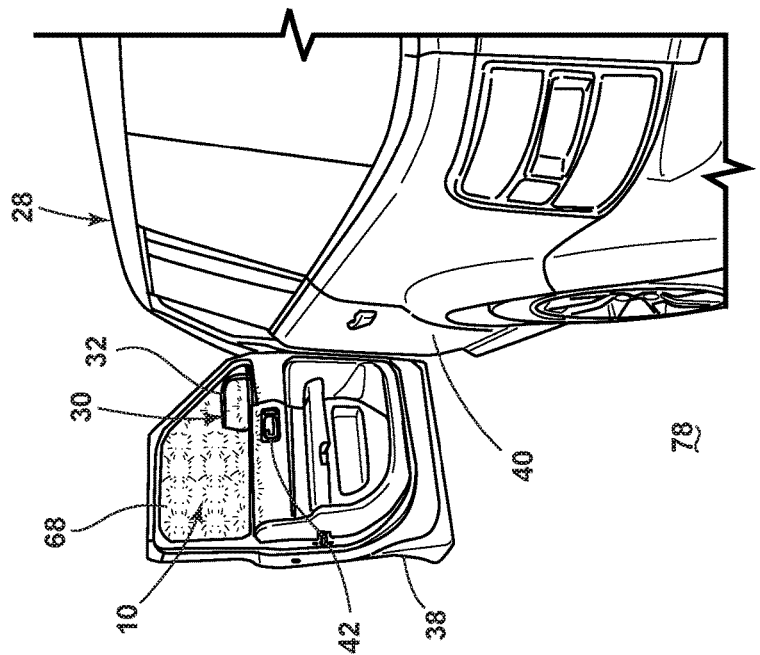
FIG. 8 is a rear perspective view of the vehicle and the door.
Figure 7:
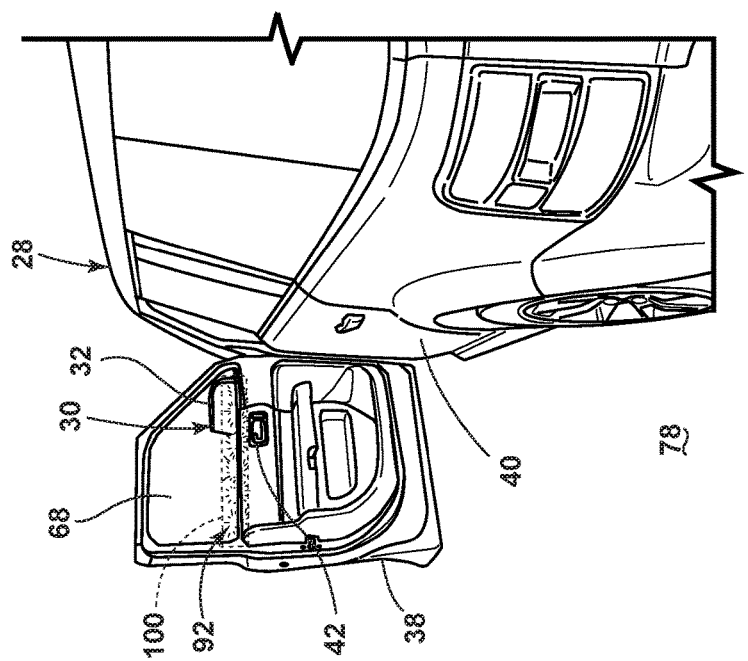
FIG. 7 is a rear perspective view of the vehicle and the door.

Referring to FIGS. 7 and 8, the emitted light 24 emanated from the first light source 62a may be directed through a bottom portion 92 of the window 68, as illustrated in FIG. 7, any other portion of the window 68, or a majority of the window 68, as illustrated in FIG. 8. In some examples, the door ajar sensor 82 may be capable of determining a magnitude of rotation and/or a percent open of the front door 38 and/or the rear door 40. In some instances, once the front door 38 and/or the rear door 40 is opened 50% or more, the emitted light 24 may be directed through the front side window 68 and/or rear side window 70. In some examples, the first light source 62a may illuminate intermittently if the front door 38 and/or the rear door 40 is open for longer than a predetermined amount of time, which may alert persons proximate the vehicle 28 and/or an occupant of the vehicle 28 of the open door condition. Additionally, and/or alternatively, a first portion may illuminate for a first set of time. Once the amount of time is elapsed, a second portion, or the remaining unilluminated portions of the window 68, 70 may be illuminated.

In some examples, the luminescent structure 10 may be disposed on the window 68, 70 and may be substantially non-visible in an unexcited state. Upon illumination of the first light source 62a, the luminescent material 18 may luminesce in the visible portion of the light spectrum. According to some examples, the luminescent structure 10 may include infrared (IR) light excitable luminescent materials 18 therein. Additionally, and/or alternatively, in some instances, the vehicle 28 may include the luminescent structure on a body component 94 thereof, such as an outer panel 96 (FIG. 5) of the front door 38 and/or the rear door 40 and/or a badge 98 (FIG. 5) or emblem. The third light source 62c may be configured to direct light at the luminescent structure. In some instances, the luminescent structure may be integrated within a paint and/or other decorative material that is disposed on the body component 94.

Still referring to FIGS. 7 and 8, the window 68, 70 may include a light-diffusing element 100 in a portion of the window 68, 70 or the full window 68, 70. In some aspects of the assembly 30, the element 100 is a film, coating, or layer deposited onto the window 68, 70. In some examples, the light-diffusing element 100 is fabricated from an acrylic polymer material containing light-diffusing particles (e.g., ACRYLITE® LED acrylic sheet from Evonik Cryo LLC). In other aspects, the light-diffusing element 100 includes a matrix of substantially transparent polymeric, glass or glass-polymeric material containing light-diffusing particles. These particles can be of similar sizes, or dissimilar sizes, and at concentrations sufficient to scatter emitted light 24 from the light sources 62a, 62b, 62c that are operably coupled with the element 100.

Figure 9:
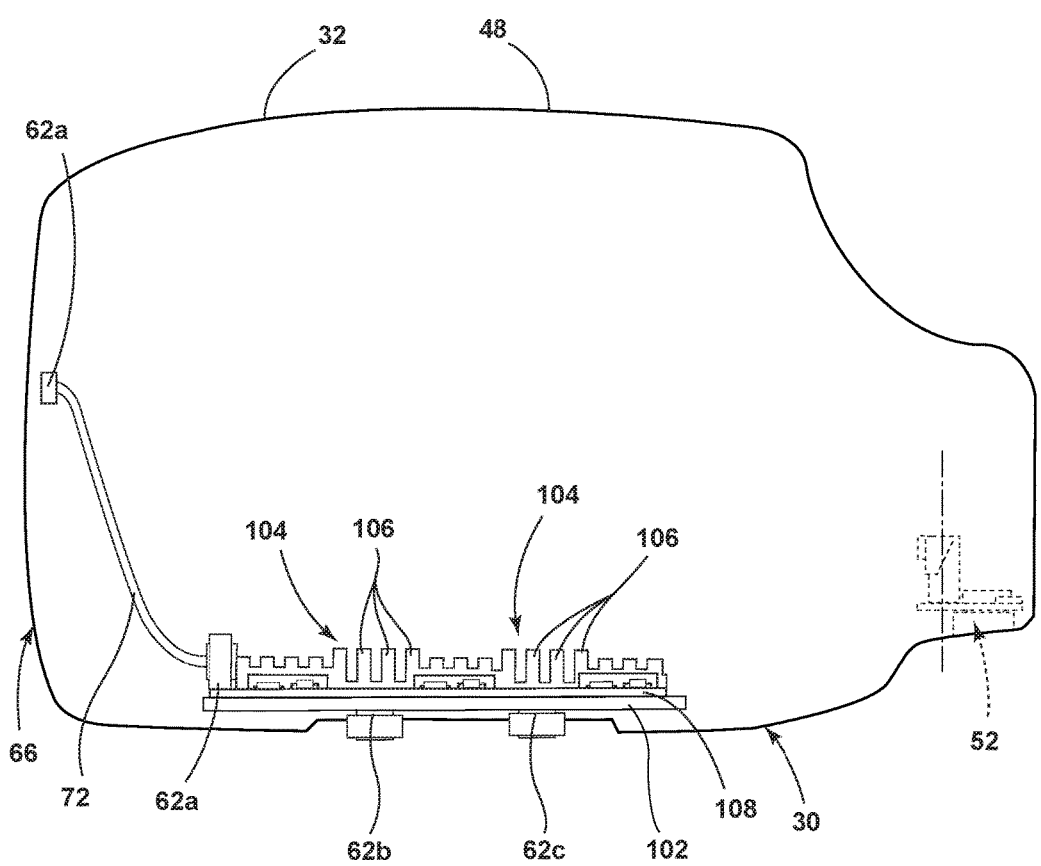
FIG. 9 is a side cross-sectional view of the exterior mirror assembly taken along the line IX-IX of FIG. 4, illustrating the lamp assembly having a plurality of light sources, a light guide, and a heatsink, according to some examples.

Referring to FIG. 9, three light sources 62a, 62b, 62c are configured in a linear array and disposed on a printed circuit board (PCB) 102. The first light source 62a may be operably coupled with the light guide 72 that is configured to direct light towards the first light output window 64. The second light source 62b may be configured to direct the emitted light 24 towards a ground surface 78 proximate the vehicle 28 to form a puddle lamp or any other type of desired lighting function. The third light source 62c may be disposed on an opposing side of the PCB 102 from the first light source 62a and may be configured to direct light along a portion of the body of the vehicle 28.

The light guide 72 described herein may be formed from a rigid material that is comprised of a curable substrate such as a polymerizable compound, a mold in clear (MIC) material or mixtures thereof. Acrylates are also commonly used for forming rigid light pipes, as well as polymethyl methacrylate (PMMA), which is a known substitute for glass. A polycarbonate material may also be used in an injection molding process to form the rigid light guides. Further, the light guide 72 may be a flexible light guide, wherein a suitable flexible material is used to create the light guide 72. Such flexible materials include urethanes, silicone, thermoplastic polyurethane (TPU), or other like optical grade flexible materials. Whether the light guide 72 is flexible or rigid, the light guide 72, when formed, is substantially optically transparent and/or translucent and capable of transmitting emitted light 24. The light guide 72 may be referred to as a light pipe, a light plate, a light bar or any other light carrying or transmitting substrate made from a clear or substantially translucent material.

Referring again to FIG. 9, as the lamp assembly 30 is being used, the light sources 62a, 62b, 62c, while emitting light, also emits heat. As heat is emitted from the light sources, a heatsink 104 captures at least a portion of this heat. The captured heat is temporarily retained within elongated members 106 of the heatsink 104. The captured heat within the heatsink 104 migrates to areas that have a lower temperature than the heatsink 104. As such, the heatsink 104, after absorbing heat from the light sources 62a, 62b, 62c, exchanges or transfers heat to cooler regions in and around the side mirror assembly 32. In some instances, the heat transferred from the elongated members 106 can serve to warm the reflective element 50 (FIG. 4) above the freezing point of water to melt snow and ice that may collect thereon. Also, the heat transferred to the reflective element 50 can serve to raise the temperature of the reflective element 50 above the dew point of the surrounding air, such that condensation that may collect on the reflective element 50 of the side mirror assembly 32 can dissipate, evaporate, or otherwise be removed from the surface of the reflective element 50 as a result of the heat from the elongated members 106 of the heatsink 104.

In the various embodiments, the elongated members 106 of the heatsink 104 can extend generally perpendicular from a back portion 108 of the heatsink 104. In such an embodiment, the elongated members 106 can be substantially linear, or can include various angled and/or curved portions. It is contemplated that, in various instances, the elongated members 106 can extend in an angled configuration or a curved configuration, or both, relative to the back portion 108 of the heatsink 104. It is further contemplated that each elongated member 106 can have configurations that can include, but are not limited to, linear, curved, angled, and trapezoidal, among other configurations. Additionally, various cross members can be included that extend across the elongated members 106 to add structure to the elongated members 106 and also add surface area through which heat can be transferred from the lamp assembly 30. It is also contemplated that the elongated members 106 may not have a consistent length. Such configurations may include a triangular profile, a trapezoidal profile, a curved profile, an irregular profile, among other similarly shaped profiles. Various embodiments of the heatsink 104 may also include more than one row of elongated members 106, such as an inner layer and outer layer of elongated members 106.

In the various embodiments, the heatsink 104 can be made of various materials that have a high thermal conductivity. Such materials can include, but are not limited to, aluminum, aluminum alloys, copper, composite materials that incorporate materials having a high thermal conductivity, combinations thereof, and other materials that are at least partially thermally conductive.

It is contemplated that the emitted light 24 emanating from the side mirror assembly 32 may have an illumination intensity similar to that of a center high mount stop lamp (CHMSL) that is mounted on a rear portion of the vehicle 28. The heat sink may remove heat from the lamp assembly 30, which may allow the light sources 62a, 62b, 62c to emanate the emitted light 24 at higher intensities than lamp assemblies of differing structures. Accordingly, the lamp assembly 30 provided herein may overcome low-power uses of existing ambient lights mounted on the front and/or rear doors 38, 40 of the vehicle 28. Moreover, the lamp assembly 30 provided herein may utilize the existing harness connections, heat sinking, and circuit board to economically implement the lamp assembly 30 provided herein.

While three light sources 62a, 62b, 62c are shown and described herein as part of the lamp assembly 30, it will be appreciated that one or more light sources 62a, 62b, 62c may be employed in various configurations and orientations. It will further be appreciated that the light sources 62a, 62b, 62c may be disposed on independent PCBs 102 and/or a common PCB 102. Moreover, one light source 62a may be capable of performing more than one function provided herein.

Figure 10:
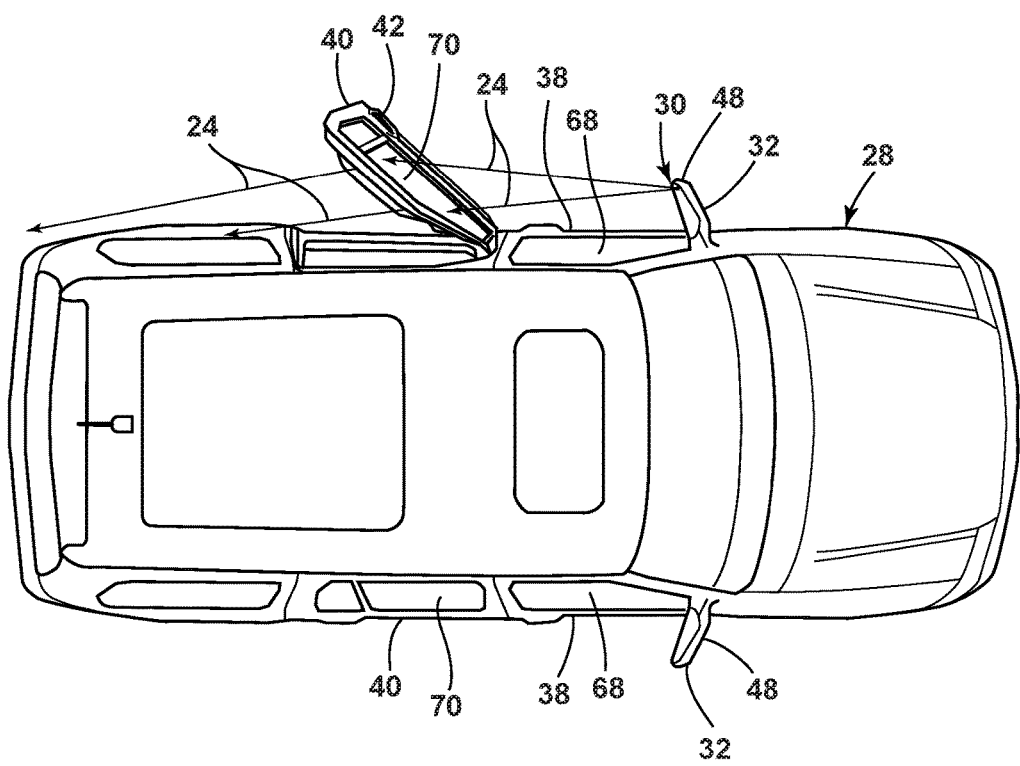
FIG. 10 is a top plan view of the vehicle with a rear door in the open position.
Figure 11:
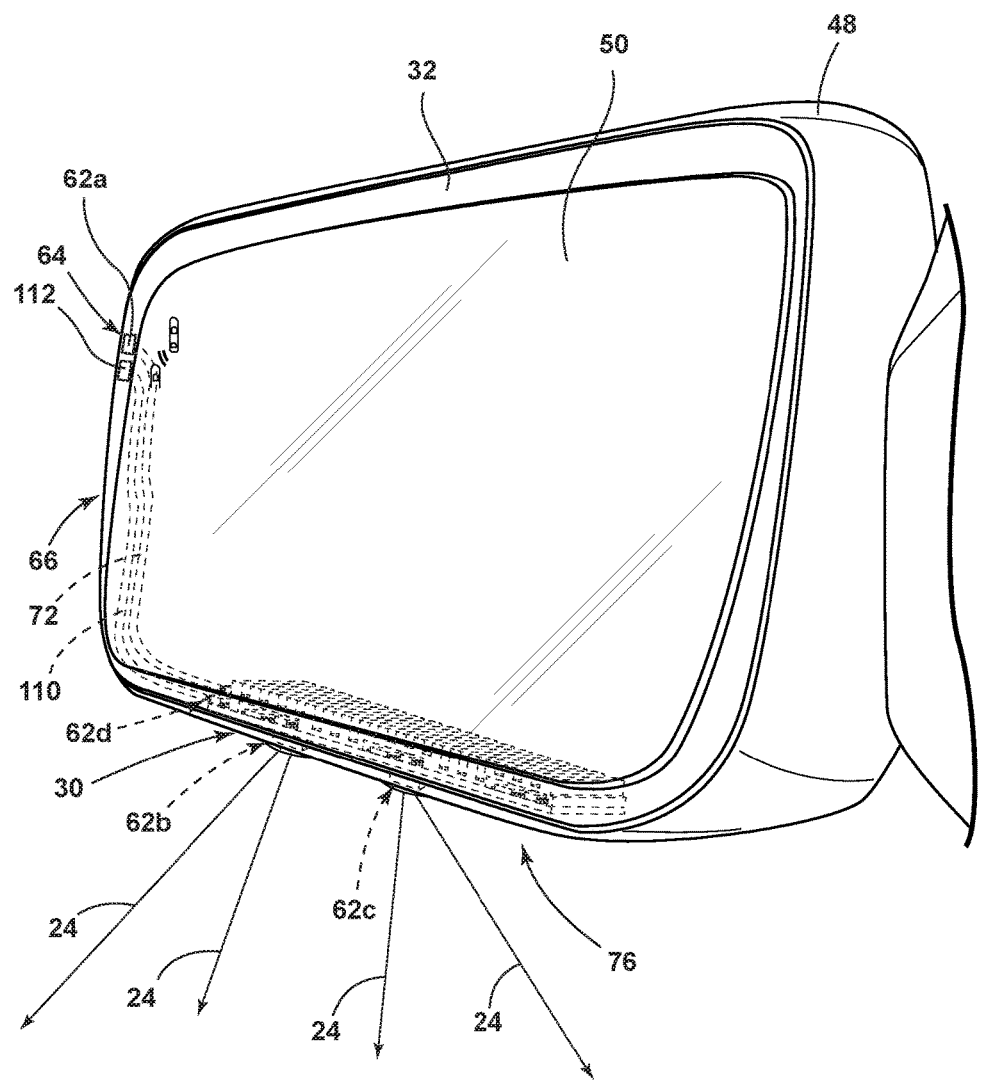
FIG. 11 is a rear perspective view of the mirror assembly having two rearwardly facing light output windows, according to some examples.

Referring to FIGS. 10 and 11, the emitted light 24 from the first light source 62a or any other light source 62b, 62c may be directed through the rear door 40 of the vehicle 28 when the door ajar sensor 82 detects that the rear door 40 has been opened, possibly past a predetermined percentage of the magnitude of rotation. The emitted light 24 may be visible on both sides of the rear door 40 such that a driver of the vehicle 28 may be alerted of the open door condition. The driver may also be able to view the illumination of the window 68, 70 through the side mirror assembly 32 and/or be alerted by the emitted light 24 emanating from the side mirror assembly 32.

With further reference to FIGS. 10 and 11, the side mirror assembly 32 may include a fourth light source 62d and/or a second light output window 112 to direct light at the rear door 40 on the same side of the vehicle 28 as the each respective mirror assembly 32. A second light guide 110 may be utilized for optically coupling the second output window 112 to the fourth light source 62d. The first and/or second light output window 112 may include optics therein for directing the emitted light 24 towards a desired target location of the rear side window 70. In some examples, one light source (e.g., 62a) may be operably coupled with both the first and second light output windows 64, 112. Additionally, and/or alternatively, a single light guide 72 may be utilized for directing emitted light 24 towards the first and second light output windows 64, 112. Additionally, and/or alternatively, a single output window 64 may direct emitted light 24 towards the front side window 68 and the rear side window 70.

Figure 12:
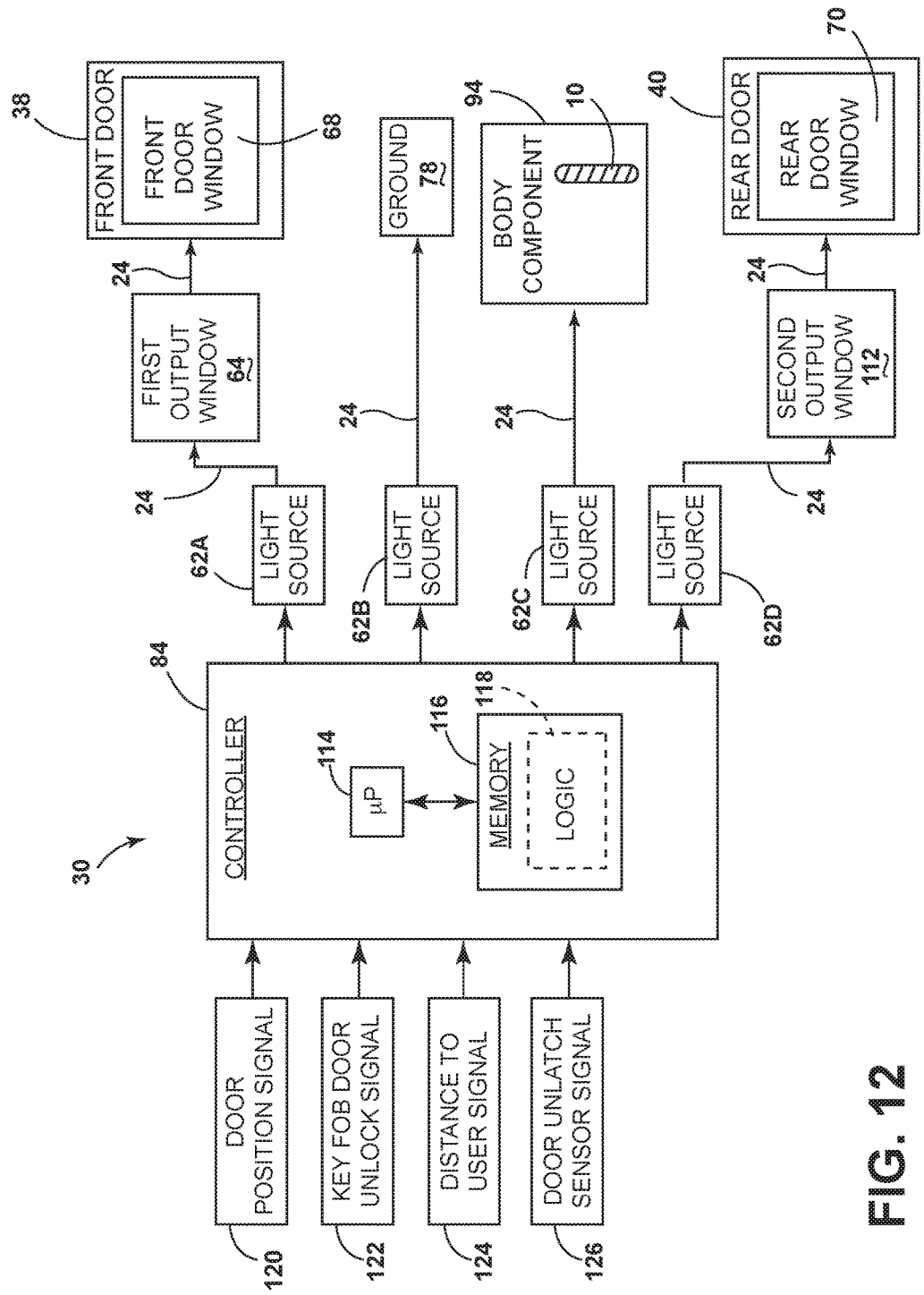
FIG. 12 is a block diagram showing the vehicle having the lamp system therein operably coupled with a controller.

Referring to FIG. 12, the lamp assembly 30 is further illustrated having the controller 84 receiving various inputs and controlling four light sources 62a, 62b, 62c, 62d by applying signals to the light sources 62a, 62b, 62c, 62d. The controller 84 may include a microprocessor 114 and memory 116 as illustrated, according to some examples. It should be appreciated that the controller 84 may include control circuitry such as analog and/or digital control circuitry. Logic 118 is stored in memory 116 and executed by the microprocessor 114 for processing the various inputs and controlling each of the plurality of light sources 62a, 62b, 62c, 62d, as described herein. The inputs to the controller 84 may include a door position signal 120, which may be made available through one or more door ajar sensors 82 (FIG. 6).

The controller 84 may determine whether any doors 38, 40 of the vehicle 28 are disposed in an open position and activate and/or deactivate the appropriate light sources 62a, 62b, 62c, 62d based on the position. For example, according to some examples, when the front door 38 is disposed in an open position, the controller 84 may activate the first light source 62a to emit light through a front side window 68 within the front door 38. The second light source 62b may emanate emitted light 24 towards the ground surface 78 below the vehicle 28 and the third light source 62c may emanate emitted light 24 towards the body component 94 of the vehicle 28.

Additionally, the controller 84 may receive a key fob door unlock/lock signal 122 and/or a distance to user signal 124, which is a distance that the occupant is detected from the vehicle 28. The distance to the user signal 124 may be generated by computing distance between the vehicle 28 and the key fob 44, according to some examples. Additionally, or alternatively, the controller 84 may include one or more of wireless communication transceivers that may be configured to interact with an electronic device. The wireless communication transceivers may communicate with the electronic device over a wireless signal (e.g., radio frequency). In one non-limiting example, the wireless communication transceivers may be a Bluetooth™ RN4020 module, or an RN4020 Bluetooth™ low energy PICtail board configured to communicate with the electronic device using Bluetooth™ low energy signals. The wireless communication transceivers may include a transmitter and a receiver to transmit and receive wireless signals (e.g., Bluetooth™ signals) to and from the electronic device, to and from the lamp assembly 30 and/or to and from the vehicle 28. It will be appreciated that the wireless communication transceivers may utilize other forms of wireless communication between with the electronic device and other wireless communication transceivers such as Wi-Fi™.

The controller 84, such as a vehicle body control module, may supply a distance to user signal 124. According to other examples, the distance to the user signal 124 could be generated using other sensors, such as an ultrasonic proximity sensor. The controller 84 further receives a door unlatch sensor signal 126. The door unlatch sensor signal 126 may be a signal sensed by the door position sensor 82, the proximity sensor 46 in the door handle 42, or may be a signal detected by activation of a sensor on the key fob 44.

The controller 84 processes the inputs and activates the lamp assembly 30 by turning the plurality of light sources 62a, 62b, 62c, 62d on and off based on the illumination of desired features (e.g., windows 68, 70) and/or the ground surface 78 disposed proximately to the vehicle 28. The controller 84 may activate the lamp assembly 30 in response to other signals such as a door position signal 120 generated by the door ajar sensor 82, according to other examples.

Referring again to FIG. 11, in operation, the luminescent structure 10, when present, may exhibit a constant unicolor or multicolor illumination in response to receiving emitted light 24 from one or more of the light sources 62a, 62b, 62c, 62d. According to some examples, the luminescent structure 10 may be disposed on and/or in the badge 98 and contain a long-persistence luminescent material 18 therein.

According to some examples, the controller 84 may prompt the one or more light sources 62a, 62b, 62c, 62d to emit only a first wavelength of emitted light 24 to cause the luminescent structure 10 to luminesce in the first color (e.g., blue). Alternatively, the controller 84 may prompt the one or more light sources 62a, 62b, 62c, 62d to emit only a second wavelength of emitted light 24 to cause the luminescent structure 10 to luminesce in the second color (e.g., white). Alternatively still, the controller 84 may prompt the one or more light sources 62a, 62b, 62c, 62d to simultaneously emit the first and second wavelengths of emitted light 24 to cause the luminescent structure 10 to luminesce in a third color defined by an additive light mixture of the first and second colors. Moreover, additional luminescent structures 10 may be added to the lamp assembly 30 that convert the emitted light 24 emitted from the one or more light sources 62a, 62b, 62c, 62d to a different wavelength. Alternatively still, the controller 84 may prompt the one or more light sources 62a, 62b, 62c, 62d to alternate between periodically emitting the first and second wavelengths of emitted light 24 to cause the luminescent structure 10 to periodically illuminate by alternating between the first and second colors of converted light 26. The controller 84 may prompt the one or more light sources 62a, 62b, 62c, 62d to periodically emit the first and/or second wavelengths of emitted light 24 at a regular time interval and/or an irregular time interval.

With respect to the above examples, the controller 84 may modify the intensity of the emitted first and second wavelengths of emitted light 24 by pulse-width modulation or current control. In some examples, the controller 84 may be configured to adjust a color of the converted light 26 by sending control signals to adjust an intensity or energy output level of the one or more light sources 62a, 62b, 62c, 62d. For example, if the one or more light sources 62a, 62b, 62c, 62d is configured to output the emitted light 24 at a low level, substantially all of the emitted light 24 may be converted to the outputted, visible converted light 26. If the one or more light sources 62a, 62b, 62c, 62d is configured to emit emitted light 24 at a high level, only a portion of the emitted light 24 may be converted to the converted light 26 by the luminescent structure 10. In this configuration, a color of light corresponding to mixture of the emitted light 24 and the converted light 26 may be output as the outputted light. In this way, each of the controllers 84 may control an output color of the outputted light.

Though a low level and a high level of intensity are discussed in reference to the emitted light 24, it shall be understood that the intensity of the emitted light 24 may be varied among a variety of intensity levels to adjust a hue of the color corresponding to the emitted excitation and/or converted light 24, 26 from the lamp assembly 30.

As described herein, the color of the converted light 26 may be dependent on the particular luminescent material 18 utilized in the luminescent structure 10. Additionally, a conversion capacity of the luminescent structure 10 may be significantly dependent on a concentration of the luminescent materials 18 utilized in the luminescent structure 10. By adjusting the range of intensities that may be emitted from the one or more light sources 62a, 62b, 62c, 62d, the concentration and proportions of the luminescent materials 18 in the luminescent structure 10 and the types of luminescent materials 18 utilized in the luminescent structure 10 discussed herein may be operable to generate a range of color hues of outputted light by blending the emitted light 24 with the converted light 26. It is also contemplated that the intensity of each one or more light sources 62a, 62b, 62c, 62d may be varied simultaneously, or independently, from any number of other light sources 62a, 62b, 62c, 62d.

A variety of advantages may be derived from the use of the present disclosure. For example, use of the disclosed lamp system provides a unique aesthetic appearance to the vehicle. Moreover, the light system may provide lighting to the occupants that are approaching and/or leaving the vehicle. The light system may also provide warning lighting to approaching vehicles and/or persons proximate the vehicle of an open door condition. The light system may also provide emitted light to one or more luminescent structures that are disposed on the exterior of the vehicle. The light system may be manufactured at low costs when compared to standard vehicle lighting assemblies.

According to various examples, a lamp assembly is provided herein. The side mirror assembly includes a first light source disposed within a housing and operably coupled with a first light output window disposed on an outboard portion of the housing. A door ajar sensor is operably coupled with the first light source. Emitted light is emanated from the first light output window through a window of a vehicle when the door ajar sensor detects a door is open. Examples of the lamp assembly can include any one or a combination of the following features:

the first light source is illuminated when the door is rotated beyond a predefined magnitude of rotation;
a light guide optically coupling the first light source with the light output window;
a second light source configured to emit light towards a ground surface proximate the vehicle;

a third light source configured to emit light towards a body component of the vehicle;

the body component includes a luminescent structure therein, the luminescent structure configured to luminesce upon receiving emitted light from the third light source;

the first, second, and third light sources are all disposed on a common printed circuit board;

a light guide optically coupling the first light source with the light output window;

the window includes a light-diffusing element in a portion thereof;

a heatsink disposed within the housing and configured to capture at least a portion of heat generated by the first light source;

the heat transferred from the heatsink is configured to warm a reflective element within the housing; and/or a second light output window disposed on an outboard portion of the housing, wherein emitted light is emanated from the second light output window through a rear window of the vehicle when the door ajar sensor detects a rear door is open.

Moreover, a method of manufacturing a lamp assembly is provided herein. The method includes disposing a first light source within a housing. The first light source is operably coupled with a first light output window disposed on an outboard portion of the housing. A door ajar sensor is coupled to a vehicle door. Emitted light is emanated from the first light output window through a window of a vehicle when the door ajar sensor detects the door is open.

According to some examples, a lamp assembly is provided herein. The lamp includes a light source disposed within a housing and operably coupled with a light output window disposed on the housing. A door ajar sensor is operably coupled with the light source. Emitted light is emanated from the light output window through a front window when the door ajar sensor detects a front door is open and through a rear window when the door ajar sensor detects a rear door is open. Examples of the lamp assembly for a vehicle can include any one or a combination of the following features:

a heatsink disposed within the housing and configured to capture at least a portion of heat generated by the light source; and/or a light guide optically coupling the light source with the light output window.

According to other examples, a vehicle is provided herein. The vehicle includes a first light output window and a second light output window disposed on a housing. Emitted light is emanated from the first light output window through a first window when a door ajar sensor detects a first door is open and from the second light output window through a second window when the door ajar sensor detects a second door is open. Examples of the vehicle can include any one or a combination of the following features:

the first and second light output windows are operably coupled with a light source;

the door ajar sensor is configured to detect a magnitude of rotation of the first and second doors;

a heatsink disposed within the housing and configured to capture at least a portion of heat generated by the first light source; and/or the light source is illuminated when the first or second door is opened beyond a predefined magnitude of rotation.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lamp assembly, comprising:
   a first light source disposed within a housing and operably coupled with a first light output window disposed on an outboard portion of the housing, the first light source configured to direct light through the first light output window and through a side window of a vehicle;
   a second light source disposed within the housing and positioned substantially perpendicular to the first light source and configured to direct light through a bottom portion of the housing; and
   a door ajar sensor operably coupled with the first light source, wherein emitted light is emanated from the first light output window through a window of the vehicle when the door ajar sensor detects a door is open.

2. The lamp assembly of claim 1, wherein the first light source is illuminated when the door is rotated beyond a predefined magnitude of rotation.

3. The lamp assembly of claim 1, further comprising:
   a light guide optically coupling the first light source with the light output window.

4. The lamp assembly of claim 1, wherein the second light source is configured to emit light towards a ground surface proximate the vehicle.

5. The lamp assembly of claim 1, further comprising:
   a third light source configured to emit light towards a body component of the vehicle.

6. The lamp assembly of claim 5, wherein the body component includes a luminescent structure therein, the luminescent structure configured to luminesce upon receiving emitted light from the third light source.

7. The lamp assembly of claim 5, wherein the first, second, and third light sources are all disposed on a common printed circuit board.

8. The lamp assembly of claim 1, further comprising:
   a second light output window disposed on an outboard portion of the housing, wherein emitted light is emanated from the second light output window through a rear window of the vehicle when the door ajar sensor detects a rear door is open.

9. The lamp assembly of claim 1, further comprising:
   a light guide optically coupling the first light source with the light output window.

10. The lamp assembly of claim 1, wherein the window includes a light-diffusing element in a portion thereof.

11. The lamp assembly of claim 1, further comprising:
    a heatsink disposed within the housing and configured to capture at least a portion of heat generated by the first light source.

12. The lamp assembly of claim 11, wherein the heat transferred from the heatsink is configured to warm a reflective element within the housing.

13. A lamp assembly, comprising:
    a light source disposed on an opposing side of a reflective element from a pivot assembly and operably coupled with a light output window positioned vertically above the at least a portion of the pivot assembly; and
    a door ajar sensor operably coupled with the light source, wherein light is emanated through a front window of an open front door and through a rear window of an open rear door.

14. The lamp assembly of claim 13, further comprising:
    a heatsink disposed within the housing and configured to capture at least a portion of heat generated by the light source.

15. The lamp assembly of claim 13, further comprising:
    a light guide optically coupling the light source with the light output window.

16. A vehicle, comprising:
    a first light output window disposed on a housing; and
    a second light output window disposed below the first light output window and vertically above at least a portion of a mirror bracket, wherein light is emanated from the first light output window through a first window when a first door is open and from the second light output window through a second window when a second door is open.

17. The vehicle of claim 16, wherein the first and second light output windows are operably coupled with a light source.

18. The vehicle of claim 17, further comprising:
    a door ajar sensor is configured to detect a magnitude of rotation of the first and second doors.

19. The vehicle of claim 18, wherein the light source is illuminated when the first or second door is opened beyond a predefined magnitude of rotation.

20. The vehicle of claim 16, further comprising:
    a heatsink disposed within the housing and configured to capture at least a portion of heat generated by the first light source.

* * * * *